US011866360B2

(12) United States Patent
Haemmerle et al.

(10) Patent No.: US 11,866,360 B2
(45) Date of Patent: Jan. 9, 2024

(54) METHOD FOR PRODUCING A PREFORM FOR PRODUCING A MULTICORE FIBRE AND ALSO A PREFORM AND A MULTICORE FIBRE

(71) Applicant: J-FIBER GMBH, Jena (DE)

(72) Inventors: Wolfgang Haemmerle, Jena (DE); Christian Schulze, Zoellnitz (DE)

(73) Assignee: J-FIBER GMBH, Jena (DE)

( * ) Notice: Subject to any disclaimer, the term of this patent is extended or adjusted under 35 U.S.C. 154(b) by 175 days.

(21) Appl. No.: 17/059,215

(22) PCT Filed: May 15, 2019

(86) PCT No.: PCT/DE2019/200043
§ 371 (c)(1),
(2) Date: Nov. 26, 2020

(87) PCT Pub. No.: WO2019/228596
PCT Pub. Date: Dec. 5, 2019

(65) Prior Publication Data
US 2021/0198139 A1     Jul. 1, 2021

(30) Foreign Application Priority Data
May 28, 2018   (DE) .................. 10 2018 112 739.1

(51) Int. Cl.
*C03B 37/012*     (2006.01)
*C03B 37/027*     (2006.01)

(52) U.S. Cl.
CPC .. *C03B 37/01222* (2013.01); *C03B 37/01234* (2013.01); *C03B 37/027* (2013.01); *C03B 2203/34* (2013.01)

(58) Field of Classification Search
CPC .......... C03B 37/0122; C03B 37/01234; C03B 37/027
See application file for complete search history.

(56) References Cited

U.S. PATENT DOCUMENTS 5,223,013 A  *  6/1993  Cook .................... C03B 37/15
                                                    428/188
2004/0151454 A1 * 8/2004 Fajardo .............. G02B 6/02333
                                                    385/126
(Continued)

FOREIGN PATENT DOCUMENTS

CN         101943767 A       1/2011
CN         104536082 A   *   4/2015    ....... C03B 37/01208
(Continued)

OTHER PUBLICATIONS

JP-2010115793-A Machine Translation—Performed Nov. 18, 2022. (Year: 2022).*
(Continued)

*Primary Examiner* — Lisa L Herring
(74) *Attorney, Agent, or Firm* — Norman B. Thot

(57) ABSTRACT

A method for producing a preform for producing a multi-core fiber. The method includes removing a first part-tube segment having a first part-tube segment cross-sectional area from a center of a receiving tube having a receiving tube internal diameter so that the receiving tube has a first core rod receiving cut-out, axially introducing a central filling rod having a filling rod external diameter into the receiving tube so that the receiving tube contains the central filling rod, inserting a first core rod having a first core rod cross-sectional area into the core rod receiving cut-out so that the receiving tube contains the core rod, axially introducing the receiving tube containing the first core rod and the central filling rod into a jacketing tube so as to obtain a jacketing tube containing the receiving tube, and fusing the jacketing tube containing the receiving tube to form the preform.

13 Claims, 3 Drawing Sheets

(56) References Cited

U.S. PATENT DOCUMENTS

| | | | |
|---|---|---|---|
| 2004/0179796 A1* | 9/2004 | Jakobsen | G02B 6/02361 |
| | | | 385/123 |
| 2010/0180995 A1* | 7/2010 | Teratani | B01J 13/185 |
| | | | 428/407 |
| 2010/0316088 A1 | 12/2010 | Bayindir et al. | |
| 2016/0075590 A1* | 3/2016 | Gonda | C03B 37/01222 |
| | | | 65/409 |
| 2020/0379168 A1* | 12/2020 | Mukasa | C03B 37/01222 |

FOREIGN PATENT DOCUMENTS

| | | | | |
|---|---|---|---|---|
| CN | 105785503 A | | 7/2016 | |
| EP | 2 406 193 A1 | | 1/2012 | |
| JP | 2003342032 A | * | 12/2003 | ......... C03B 37/0122 |
| JP | 2010115793 A | * | 5/2010 | |
| WO | WO 2012/043675 A1 | | 4/2012 | |

OTHER PUBLICATIONS

JP2003-342032A Machine Translation Clarivate Analytics Performed Mar. 1, 2023. (Year: 2023).*

CN104536082A EPO Machine Translation performed Feb. 28, 2023. (Year: 2023).*

\* cited by examiner

METHOD FOR PRODUCING A PREFORM FOR PRODUCING A MULTICORE FIBRE AND ALSO A PREFORM AND A MULTICORE FIBRE

CROSS REFERENCE TO PRIOR APPLICATIONS

This application is a U.S. National Phase application under 35 U.S.C. § 371 of International Application No. PCT/DE2019/200043, filed on May 15, 2019 and which claims benefit to German Patent Application No. 10 2018 112 739.1, filed on May 28, 2018. The International Application was published in German on Dec. 5, 2019 as WO 2019/228596 A1 under PCT Article 21(2).

FIELD

The present invention relates to a method for producing a preform for producing a multi-core fiber and also a preform and a multi-core fiber.

BACKGROUND

The options of temporal multiplexing, wavelength multiplexing, and spatial multiplexing, as well as mode-group division multiplexing for multi-mode fibers, principally exist to enhance the transmission capacity of optical fibers. The possibilities for increasing the transmission capacities of conventional single-core fibers are slowly approaching their technical and physical limits. Reducing the core diameter or reducing the numerical aperture offer only limited possibilities for enhancement.

Multi-core fibers are therefore being developed for spatial multiplexing methods. Multi-core fibers have several times the transmission capacity of a fiber with only a single core depending on the number of cores. The core diameter of the individual cores of multi-core fibers is generally less than 50 µm. Since a reduced number of core modes are able to propagate in such cores, higher bandwidths are in principle possible for complete or also limited excitation than are possible with conventional multi-mode fibers.

Multi-core fibers are manufactured using the so-called "stack and draw method". In this method, core preforms and pure quartz rods of various diameters are stacked in a relatively complex process so that they exhibit a specific symmetry and a relatively high packing density. The rods are then introduced into a jacketing tube so as to be spatially fixed, and fused to a final preform, either before the fiber is drawn or while the fiber is being drawn. A relatively large number of filling rods of various diameters must be used in addition to the wave-guiding core rods to achieve the desired high packing density. The stacking of the individual rods in the desired packing structure and symmetry is relatively complex and can easily lead to stacking errors which then render the fused secondary preform or the final fiber useless. Since the packing density achievable in the radial direction varies, the secondary preform after fusion with no residual cavities will generally have radii with different values in the azimuthal direction which must accordingly be evened out on the secondary preform by plain grinding, they will otherwise lead to the fiber being non-round in some places.

Using a plurality of individual rods with different diameters results in the stacked preform having a plurality of interfaces before fusion, which lead to bubbles in the fused secondary preform or in undesired bubbles in the fiber during the fusion as a result of possible contaminations or surface inhomogeneities. Bubbles remaining at the interfaces or foreign particles also lead to diameter errors on the fiber and to higher damping values as a result of light scattering, and have an adverse effect on the fiber strength, and must therefore be avoided.

A further previously-described production method to produce multi-core fibers consists in drilling holes in the axial direction into a glass cylinder and introducing core rods into these holes. The secondary preform thus produced can either be fused before the drawing or while the fiber is being drawn. The problems with this production method consist in it being difficult to drill sufficiently deep holes into the quartz rod in the axial direction with sufficient precision in respect of the parallel orientation to the longitudinal axis. Ultrasonic drilling methods are usually used to drill the holes. The holes drilled with ultrasound must be either polished or at least smoothed with the aid of fire-polishing with regard to the roughness of the inner surface of the hole. The fabrication of multi-core preforms of sufficiently long preform length and with a large number of cores leads to high fabrication costs and accordingly undesirably large geometric errors in respect of the achievable eccentricity of the cores as far as their desired positions are concerned.

SUMMARY

An aspect of the present invention is to improve upon the prior art.

In an embodiment, the present invention provides a method for producing a preform for producing a multi-core fiber. The method includes removing a first part-tube segment comprising a first part-tube segment cross-sectional area from a center of a receiving tube comprising a receiving tube internal diameter so that the receiving tube comprises a first core rod receiving cut-out, axially introducing a central filling rod comprising a filling rod external diameter into the receiving tube, the filling rod external diameter being less than the receiving tube internal diameter so that the receiving tube contains the central filling rod, inserting a first core rod comprising a first core rod cross-sectional area into the core rod receiving cut-out so that the receiving tube contains the core rod, axially introducing the receiving tube containing the first core rod and the central filling rod into a jacketing tube so as to obtain a jacketing tube containing the receiving tube, and fusing the jacketing tube containing the receiving tube to form the preform.

BRIEF DESCRIPTION OF THE DRAWINGS

The present invention is described in greater detail below on the basis of embodiments and of the drawings in which.

DETAILED DESCRIPTION

Figure 1:
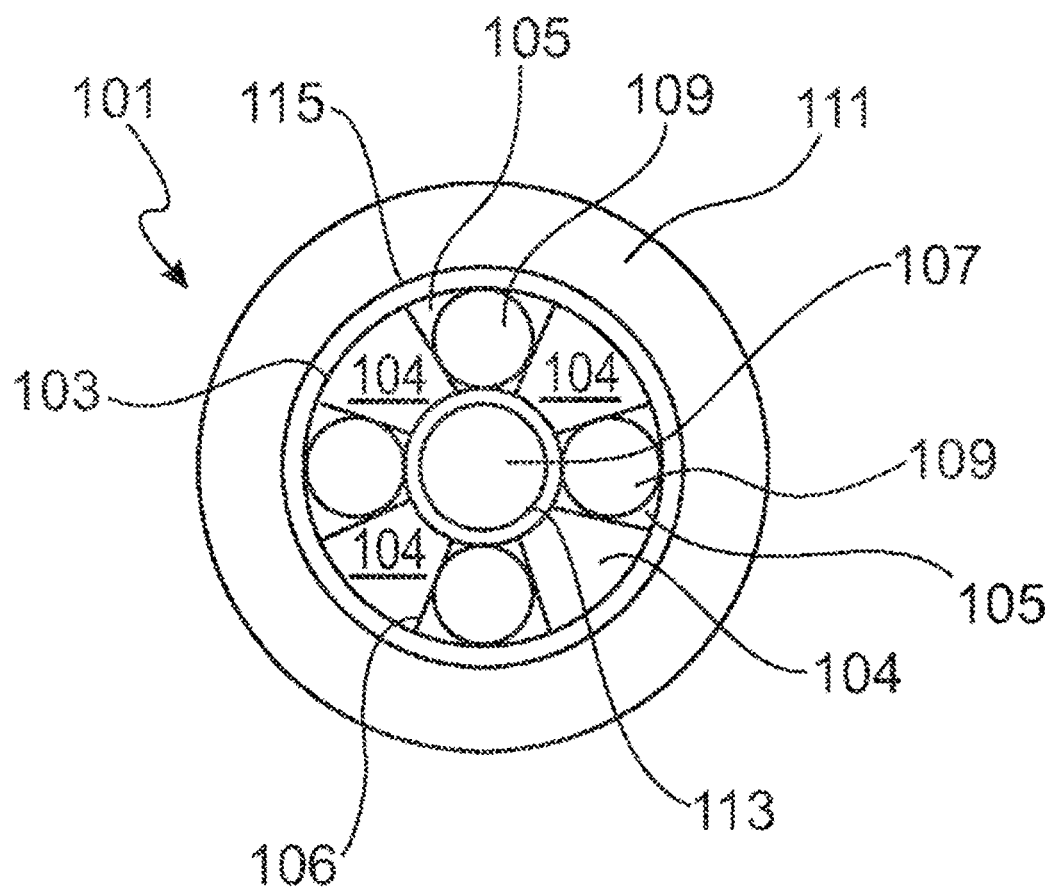
FIG. 1 shows a highly schematic radial cross-sectional representation of a jacketing tube with receiving tube, where four core rods and a central filling rod are arranged in the receiving tube.
Figure 2:
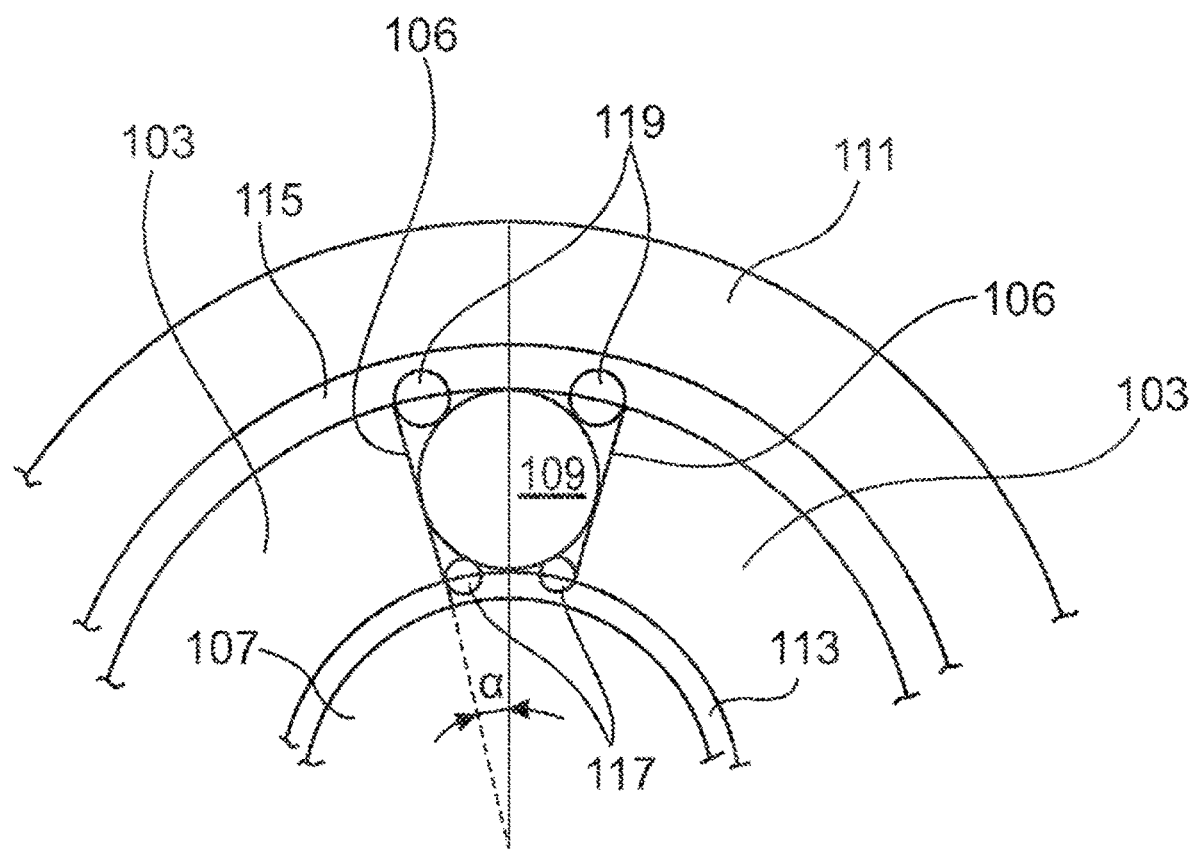
FIG. 2 shows a highly schematic partial sectional view of a preform with a core rod and filing rods before fusing.
Figure 3:
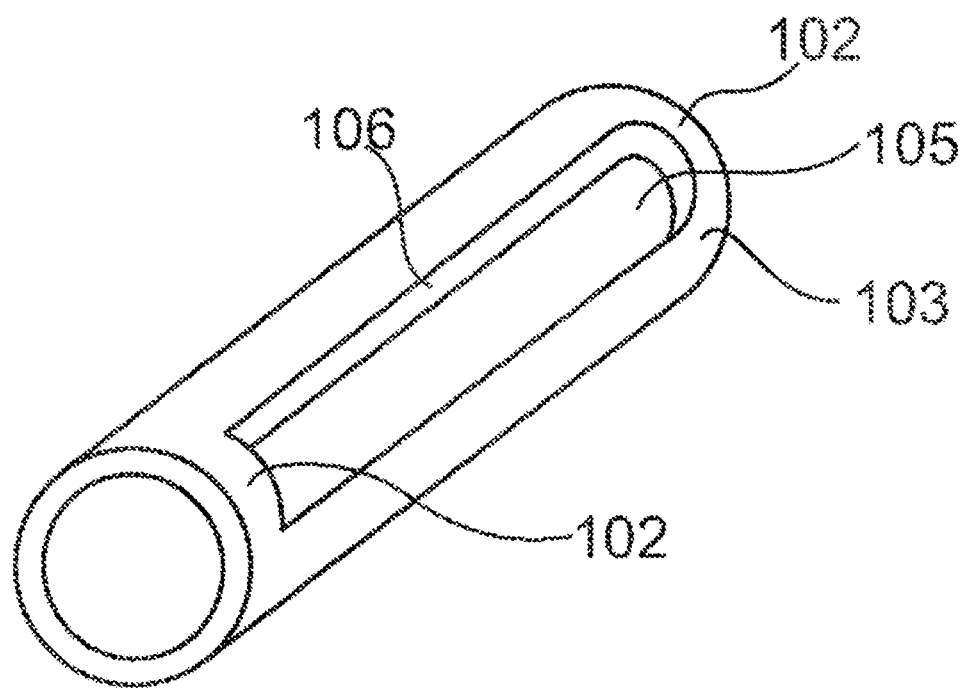
FIG. 3 shows a highly schematic three-dimensional representation of a receiving tube with a core rod receiving cut-out.

The present invention provides a method for producing a preform for producing a multi-core fiber comprising the following steps:

removing a first part-tube segment with a first part-tube segment cross-sectional area from the center of a receiving tube with a receiving tube internal diameter so that the receiving tube has a first core rod receiving cut-out;

axially introducing a central filling rod with a filling rod external diameter into the receiving tube, the filling rod external diameter being less than the receiving tube internal diameter so that the receiving tube contains the central filling rod;

inserting a first core rod with a first core rod cross-sectional area into the core rod receiving cut-out so that the receiving tube contains the core rod;

axially introducing the receiving tube containing the first core rod and the central filling rod into a jacketing tube so that a jacketing tube containing the receiving tube is obtained; and fusing the jacketing tube containing the receiving tube to form a preform, so that a preform is obtained.

This allows the geometry of the stacked and/or fused secondary preforms or the final fiber to be significantly improved. This additionally obviates the need to stack the otherwise usual large number of filling and core rods with respect to each other so that stacking errors cannot occur with the present method or their frequency is at least significantly reduced.

When the core rod or hereinafter also the core rods are fitted exactly between the edges of the remaining annular sectors and thus of the cut-outs, a high degree of precision in relation to the azimuthal angular position as well as the radial position can be maintained. The fixed position for the core rod prevents the core rod from shifting in the subsequent production process. The core rods can also be positioned according to a predefined radial pattern. It is thus also possible to produce laser fibers which have a basic core which deviates from a cylindrical symmetry.

One core aspect of the present invention is thus forming the receiving tube so that the core rod can be oriented and/or fixed in a defined alignment.

The following terms are here explained:

"Preforms" are used in the production of optical fibers. The long, and compared to the preform, very thin optical waveguide is in particular produced by drawing the preform. The preform can here in particular be produced from a glassy material such as quartz. Individual elements can be doped or have a specific coating so that the conditions for total internal reflection inside the fiber are provided. The preform typically has a length of approximately 1 meter and a diameter of between 10 and 50 millimeters. The preform additionally essentially already has the refractive index profile of the subsequent fiber.

A "multi-core fiber" is in particular an optical waveguide, also called a fiber optic light cable, where not only one core, but several cores are used so that spatially parallel light signals can be transported simultaneously via the cores.

The "receiving tube" forms an essential part of the subsequent preform. This receiving tube is made, for example, of high-purity quartz ($SiO_2$). This receiving tube in particular forms a matrix for the core rod to be introduced after the part-tube segment has been removed from the center.

The "removal from the center" can also be performed by milling or by laser cutting. The center shall in particular be understood as a bar remaining at each end of the part-tube segment towards the corresponding end of the receiving tube. This means that the receiving tube is furthermore essentially stable. The removal can be carried out so that the core rod can be fixed in the core rod receptacle.

The "part-tube segment" is that part of the receiving tube which is in particular formed by being cut out from the receiving tube. After removing the part-tube segment from the receiving tube, it is thus possible not only to gain access from the sides into the inside of the receiving tube at the sides of the end of the receiving tube, but also from the long side. A "core rod receiving cut-out" in the receiving tube is thus obtained after the part-tube segment has been removed by cutting it out.

An "axial introduction" is the insertion of a component at one end of the receiving tube in the longitudinal direction along the longitudinal axis.

The "part-tube segment cross-sectional area" is the area of the part-tube segment which is formed by a section in the radial direction.

The "central filling rod" serves, for example, to support the core rod and to fill the receiving tube with the appropriate fiber material.

The "receiving tube internal diameter" is the internal diameter of the receiving tube and is designed so that the central filling rod with its "external diameter" can be introduced axially. With an axially introduced central filling rod, a gap forms between the filling rod and the receiving tube because of the different diameters.

The "first core rod" is in particular "inserted" in the radial direction from the outside, whereafter the insertion a cylindrical surface of the core rod lies, for example, on the cylindrical surface of the filling rod.

The "core rod" is designed so that it guides the light in the subsequent multi-core fiber.

The "core rod cross-sectional area" is in particular the area of the core rod which is formed by a radial section through the core rod.

The jacketing tube is also called a "casing tube". After the "fusion", the jacketing tube, the central filling rod, the receiving tube, and the core rod form the preform. During the fusion process, the application of the requisite temperature causes the structure to become viscous so that the individual components fuse with each other. This can be carried out, for example, in a vacuum and an appropriate mold so that the preform thereafter has a round, polygonal or rectangular form.

To arrange several cores in the preform, the method can comprise the following steps before the fusion to the preform:

cutting out a second part-tube segment with a second part-tube segment cross-sectional area, a third part-tube segment with a third part-tube segment cross-sectional area, a fourth part-tube segment with a fourth part-tube segment cross-sectional area, and/or further part-tube segments each with a part-tube segment cross-sectional area from the center of the receiving tube so that the receiving tube has a second core rod receiving cut-out, a third core rod receiving cut-out, a fourth core rod receiving cut-out, and/or further core rod receiving cut-outs, and the respective core rod receiving cut-outs are azimuthally separated from each other by material of the receiving tube;

inserting a second core rod, a third core rod, a fourth core rod, or further core rods into the second core rod receiving cut-out, into the third core rod receiving cut-out, into the fourth core rod receiving cut-out, and/or into the further core rod receiving cut-outs so that the receiving tube contains these core rods; and axially inserting the receiving tube containing the core rods and the central filling rod into the jacketing tube so that the jacketing tube contains the receiving tube.

The method for the first core rod is thus essentially extended to further core rods.

To provide the cross-sectional area to in particular be as circular as possible and/or to provide the core rods arranged as homogeneously as possible, the respective core rods can be arranged or selected so that the respective core rod cross-sectional areas essentially correspond to the respective part-tube segment cross-sectional area.

This can be performed, for example, by determining the part-tube segment cross-sectional area and the core rod cross-sectional area by metrological means and selecting a round core rod with a corresponding area. The deviations of the core cross-sectional area from the part-tube segment cross-sectional area should be less than +/−5%, in particular less than +/−2%, and in particular less than +/−0.5%. The cross-sectional area of the sector can also be determined mathematically.

In an embodiment of the present invention, one filling rod or several filling rods can, for example, be inserted into the appropriate core rod receiving cut-outs before or after the core rod and/or the further core rods are inserted.

This not only means that the corresponding voids can be provided with appropriate fiber material so that deviations from a round shape are smaller after the fusion. The filling rods can also be used for a defined positioning. The filling rod material in particular corresponds to the receiving tube material. The filling rod or correspondingly the filling rods can have the form of an inner filling rod or inner filling rods, or an outer filling rod or outer filling rods. The inner filling rods here in particular have a smaller diameter then the outer filling rods. The inner filling rods are in particular arranged between the central filling rod and the respective core rod, and the outer filling rod or the outer filling rods between the core rod and the jacketing tube.

In an embodiment of the present invention, the inner filling rod or all inner filling rods of the particular core rod receptacle, and/or the outer filling rod or all outer filling rods of the particular core rod receptacle, can, for example, be designed so that their total cross-sectional area essentially corresponds to the corresponding part-tube segment cross-sectional area.

The part-tube segment cross-sectional area can again be determined by metrological or mathematical means, and the areas can here be matched to each other by summing up the cross-sectional areas of the core rods and the filling rods. "Essentially" here in particular means that the deviation of the total cross-sectional area from the part-tube segment cross-sectional area corresponds to less than +/−1.5%, in particular less than +/−0.8%.

To increase the number of cores, the first core rod and/or the further core rods can themselves have multi-cores. A core rod may have been fabricated in the same way as the preform above.

To achieve particularly homogeneous surfaces which do not need to be pre-polished and/or post-processed, the removal of the part-tube segment or the part-tube segments can be carried out via laser cutting, in particular via a $CO_2$ laser.

The fusing to the preform can also take place before or during the drawing of a preform to a multi-core fiber. The energy required to produce the multi-core fiber can in particular be reduced when the drawing and fusing take place simultaneously. This is in particular possible when the corresponding cross-sectional areas of the filling and core rods correspond to the part-tube segment cross-sectional areas, since high precision is thus achieved in respect of the geometries, and post-processing of the preform is not required.

The present invention also provides a preform which was produced according to one of the above-described methods.

The present invention also provides a multi-core fiber which is produced by drawing the preform, or the simultaneous fusing and drawing of the preform to a multi-core fiber.

An embodiment of the present invention is explained below under reference to the drawings.

A receiving tube 103 fabricated from quartz is slit open in the center of one side by means of a $CO_2$ laser and a part-tube segment (not shown in the drawings) is removed. The opening remaining serves as a core rod receiving cut-out 105. Cutting out the segment creates a cut edge 106. The stability of the receiving tube 103 is essentially preserved due to the edge pieces 102.

A total of four part-tube segments are removed from the receiving tube 103 so as to be uniformly distributed in the radial direction so that four core rod receiving cut-outs 105 exist.

In a first alternative, a central filling rod 107 is fully inserted in the axial direction into the side of the receiving tube 103. One core rod 109 is inserted laterally into each corresponding core rod receiving cut-out 105. After all four core rod receiving cut-outs 105 have been equipped with core rods 109, the receiving tube 103 into which the central filling rod 107 has been introduced and core rods 109 resting thereon are introduced axially from the side into a jacketing tube 111. A preform 101 is thus formed before the fusing process (see FIG. 1).

Residual tube segments 104 are provided between the core rods in question as part of the receiving tube 103. The core rods 109 each contact the cut edges 106 at two points. A jacketing-tube void 115 is provided between the receiving tube 103 and the jacketing tube 111. A core-rod void 113 is similarly provided between the central filling rod 107 and the receiving tube 103.

The preform 101 is then fused so that all voids are closed, and the fused preform is simultaneously or subsequently drawn to a multi-core fiber.

In a second alternative, after the receiving tube 103 has been equipped with the central filling rod 107, first two inner filling rods 117, then the core rod 109, and then subsequently two outer filling rods 119 are inserted into each core rod receiving cut-out 105. The receiving tube 103 so equipped is subsequently inserted axially from the side into the jacketing tube 111.

The cross-sectional area of the part segment tube was determined by metrological means with all embodiments. In the first alternative, the circular area of the core rod of the part segment tube cross-sectional area, and in the second alternative, the sums of the cross-sectional areas of the two inner filling rods 117, the two outer filling rods 119, and the core rod 109, correspond to the part segment tube cross-sectional area determined.

The present invention is not limited to embodiments described herein; reference should be had to the appended claims.

What is claimed is:

1. A method for producing a preform for producing a multi-core fiber, the method comprising:
   removing a first part-tube segment comprising a first part-tube segment cross-sectional area from a center of a receiving tube comprising a receiving tube internal diameter so that the receiving tube comprises a first core rod receiving cut-out formed as a remaining annular sector with two opposite edges;

axially introducing a central filling rod comprising a central filling rod external diameter into the receiving tube, the central filling rod external diameter being less than the receiving tube internal diameter so that the receiving tube contains the central filling rod;

inserting a first core rod comprising a first core rod cross-sectional area in a radial direction from outside into the first core rod receiving cut-out between the two opposite edges of the remaining annular sector so that the receiving tube contains the first core rod;

axially introducing the receiving tube containing the first core rod and the central filling rod into a jacketing tube so as to obtain a jacketing tube containing the receiving tube; and fusing the jacketing tube containing the receiving tube to form the preform, wherein, the preform is at least one of fused and drawn to provide the multi-core fiber; and the multi-core fiber is an optical waveguide.

2. The method as recited in claim 1, wherein, prior to fusing the jacketing tube containing the receiving tube to form the preform, the method further comprises:

removing at least one of,
a second part-tube segment comprising a second part-tube segment cross-sectional area,
a third part-tube segment comprising a third part-tube segment cross-sectional area,
a fourth part-tube segment comprising a fourth part-tube segment cross-sectional area, and
further part-tube segments each comprising a further part-tube segment cross-sectional area, from the center of the receiving tube so that the receiving tube comprises at least one of,
a second core rod receiving cut-out,
a third core rod receiving cut-out,
a fourth core rod receiving cut-out, and
further core rod receiving cut-outs, and azimuthally separating the second core rod receiving cut-out, the third core rod receiving cut-out, the fourth core rod receiving cut-out, and the further core rod receiving cut-outs, as the case might be, from each other by a material of the receiving tube;

inserting at least one of,
a second core rod into the second core rod receiving cut-out,
a third core rod into the third core rod receiving cut-out,
a fourth core rod into the fourth core rod receiving cut-out, and
further core rods into the further core rod receiving cut-outs, so that the receiving tube contains the second core rod, the third core rod, the fourth core rod, and the further core rods, as the case might be; and axially introducing the receiving tube containing the second core rod, the third core rod, the fourth core rod, and the further core rods, as the case might be, and the central filling rod into the jacketing tube so that the jacketing tube contains the receiving tube.

3. The method as recited in claim 2, wherein, the first core rod is designed so that the first core rod cross-sectional area essentially corresponds to the first part-tube segment cross-sectional area, the second core rod comprises a second core rod cross-sectional area, the second core rod being designed so that the second core rod cross-sectional area essentially corresponds to the second part-tube segment cross-sectional area, the third core rod comprises a third core rod cross-sectional area, the third core rod being designed so that the third core rod cross-sectional area essentially corresponds to the third part-tube segment cross-sectional area, the fourth core rod comprises a fourth core rod cross-sectional area, the fourth core rod being designed so that the fourth core rod cross-sectional area essentially corresponds to the fourth part-tube segment cross-sectional area, and the further core rods each comprise a further core rod cross-sectional area, each of the further core rods being designed so that each further core rod cross-sectional area corresponds to each further part-tube segment cross-sectional area.

4. The method as recited in claim 3, further comprising:
inserting at least one filling rod into the first core rod receiving cut-out, the second core rod receiving cut-out, the third core rod receiving cut-out, the fourth core rod receiving cut-out, and the further core rod receiving cut-outs, as the case might be, before or after the first core rod, the second core rod, the third core rod, the fourth core rod, and the further core rods, as the case might be, are inserted.

5. The method as recited in claim 4, wherein one inner filling rod, two inner filling rods, or several inner filling rods is or are inserted into the first core rod receiving cut-out, the second core rod receiving cut-out, the third core rod receiving cut-out, the fourth core rod receiving cut-out, and the further core rod receiving cut-outs, as the case might be, before the first core rod, the second core rod, the third core rod, the fourth core rod, and the further core rods, as the case might be, are inserted.

6. The method as recited in claim 4, further comprising:
inserting at least one outer filling rod into the first core rod receiving cut-out, the second core rod receiving cut-out, the third core rod receiving cut-out, the fourth core rod receiving cut-out, and the further core rod receiving cut-outs, as the case might be, which is provided with the first core rod, the second core rod, the third core rod, the fourth core rod, and the further core rods, as the case might be, before the axial introduction of the receiving tube into the jacketing tube.

7. The method as recited in claim 6, wherein at least one of,
the at least one inner filling rod is designed so that its total cross-sectional area essentially corresponds to the first part-tube segment cross-sectional area, the second part-tube segment cross-sectional area, the third part-tube segment cross-sectional area, the fourth part-tube segment cross-sectional area, and the further part-tube segment cross-sectional area, as the case might be, and
the at least one outer filling rod is designed so that its total cross-sectional area essentially corresponds to the first part-tube segment cross-sectional area, the second part-tube segment cross-sectional area, the third part-tube segment cross-sectional area, the fourth part-tube segment cross-sectional area, and the further part-tube segment cross-sectional area, as the case might be.

8. The method as recited in claim 2, wherein at least one of,
the first core rod further comprises multi-core rods, the second core rod further comprises multi-core rods,
the third core rod further comprises multi-core rods,
the fourth core rod further comprises multi-core rods,
the further core rods each comprise multi-core rods.

9. The method as recited in claim 2, wherein the removal of the first part-tube segment, the second part-tube segment, the third part-tube segment, the fourth part-tube segment, and the further part-tube segments, as the case might be, is performed via a laser cutting.

10. The method as recited in claim 9, wherein the laser cutting is performed by a $CO_2$ laser.

11. The method as recited in claim 1, wherein the fusing to form the preform is performed before the preform is drawn into the multi-core fiber.

12. The method as recited in claim 1, wherein the fusing to form the preform is performed while the preform is being drawn into the multi-core fiber.

13. The method as recited in claim 1, wherein the optical waveguide of the multi-core fiber is configured to transport spatially parallel light signals simultaneously.

\* \* \* \* \*